United States Patent [19]

Sarasola

[11] Patent Number: 4,880,109
[45] Date of Patent: Nov. 14, 1989

[54] CHAIN HAULED CONVEYOR BELT
[75] Inventor: Javier A. Sarasola, Madrid, Spain
[73] Assignee: Mackina Westfalia S.A., Madrid, Spain
[21] Appl. No.: 122,405
[22] Filed: Nov. 19, 1987
[30] Foreign Application Priority Data
Nov. 21, 1986 [ES] Spain .................................. 8603119
[51] Int. Cl.$^4$ ............................................ B65G 23/16
[52] U.S. Cl. ..................................... 198/833; 198/834
[58] Field of Search ......................... 198/833, 834, 835
[56] References Cited
U.S. PATENT DOCUMENTS

| | | | |
|---|---|---|---|
| 2,732,059 | 1/1956 | Erisman | 198/833 |
| 2,759,595 | 8/1956 | Lauenstein | 198/833 X |
| 3,094,206 | 6/1963 | Stewart et al. | 198/834 |
| 3,338,380 | 8/1967 | Grebe | 198/835 X |
| 3,910,406 | 10/1975 | Pulver et al. | 198/833 |
| 4,058,204 | 11/1977 | Arieh | 198/833 |
| 4,282,971 | 8/1981 | Becker | 198/834 X |
| 4,363,399 | 12/1982 | Ludwig et al. | 198/833 |
| 4,422,544 | 12/1983 | Alldredge | 198/833 X |

Primary Examiner—Robert J. Spar
Assistant Examiner—D. Glenn Dayoan
Attorney, Agent, or Firm—James Markarian

[57] ABSTRACT

Figure 1:
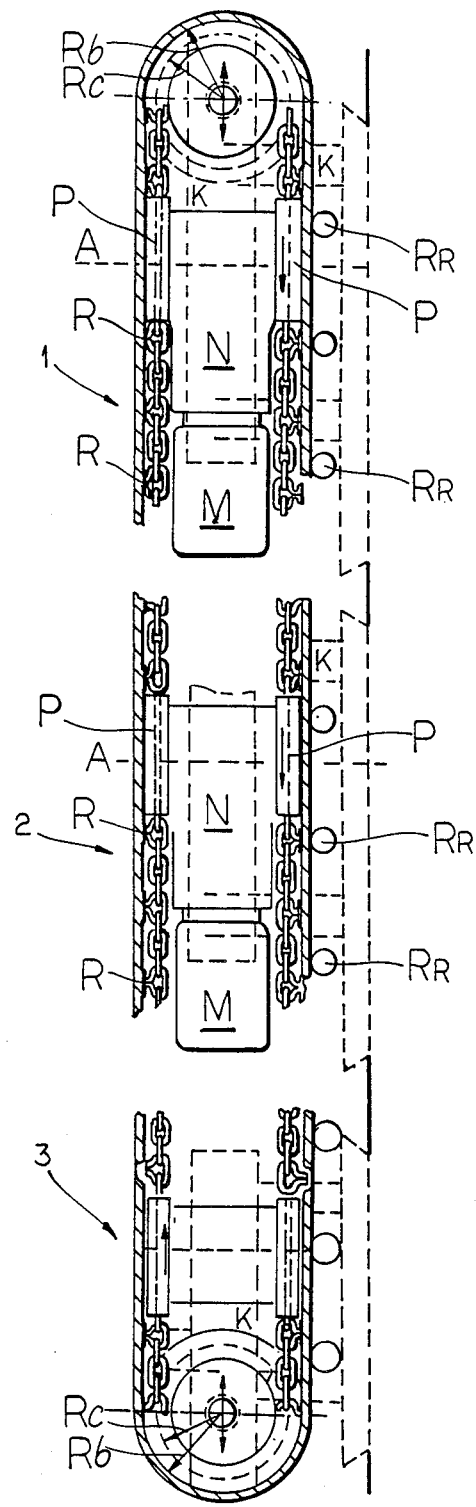

A chain-hauled conveyor belt has been described, with a conveyor belt resting on rollers, a link chain, a drive unit and a conveyor belt returning apparatus. Essentially, the conveyor belt is characterized in that the drive consists of a motor (M), a reducing gear (N) with a series of drive shafts and a series of pinions ($I_1$ to $I_4$) which engage with the links (H) of the chain, racks or caterpillar track type drive (P) which are linked by pins (J) and which enable the chain to be driven by the pinions ($I_1$ to $I_4$) and a movable returning drum with a central groove in which the chain is accommodated. FIG. 1.

7 Claims, 5 Drawing Sheets

CHAIN HAULED CONVEYOR BELT

The present invention relates to a chain-hauled conveyor belt.

In the mining industry chain-hauled conveyor-belts are already familiar, but they suffer from several disadvantages, notably with regard to the handling of curves in the belt necessitated by the lie of the ground.

For example, a chain-hauled conveyor belt is already known to exist where, in order to achieve belt adaptability when a curved section is required, the various free lengths of belt are placed between the corresponding belt sections and attached by means of a fastening device to the links of the chain, thus forming a convex shape without becoming taut.

In the case of the chain-hauled conveyor belt which is the subject matter of this invention, the aim is to improve on systems known hitherto by making it possible, by the way in which the belt is guided, for the belt to accommodate bends and, at the same time, to insert as many driving units as may be necessitated by the desired conveyor length and load capacity.

According to the present invention, the chain-hauled conveyor belt, which is for use particularly in mining, possesses a conveyor belt, a link chain which rests on rollers and is attached to the belt by means of conventional fastenings, a drive unit and a belt returning apparatus, and is characterized by a drive unit which takes the form of a motor (M) which delivers a number of revolutions per minute and a power output which are suitable for the conveyor; a reduction gear (N) with a total of eight output shafts, each with a pinion ($I_1$, $I_2$, $I_3$ and $I_4$) which engages with the links (H) of the chain; four of these pinions rotate in one direction and four in the other; racks or CATERPILLAR TRACK type drive (P) formed by the links (H) which are connected to one another by pins and enable the chain to be driven by the pinions ($I_1$ to $I_4$); there being also a movable returning drum (X) of cylindrical shape, with a central groove in which the chain is accommodated, allowing the links to remain slack since the radius (Rc) of the chain is smaller than the radius (Rb) described by the belt.

In accordance with another characteristic of the subject matter of the invention, chain guide pulleys are provided, which may or may not be toothed.

In accordance with a further aspect, in the conveyor belt one or more drive units may be incorporated along the length of the conveyor, which are similar to the principal one but do not have returning drums (X).

Another characteristic of the invention is that the racks or CATERPILLAR TRACK type drive (P) are mechanically linked, and one can be disengaged.

Moreover, in this invention belt return is effected on the under side, the belt resting on return roller (RR) and the chain remaining on the upper surface of the belt.

The conveyor belt (B) may be subdivided into different sections joined together by any normal method of attachment such as clamps.

One preferred but non-limiting embodiment of the chain-hauled conveyor belt which is the subject matter of the invention will now be described, with the help of the accompanying drawings. In these drawings:

FIG. 1 shows a longitudinal section of a general arrangement of the conveyor belt which is the subject matter of the invention.

Figure 2A:
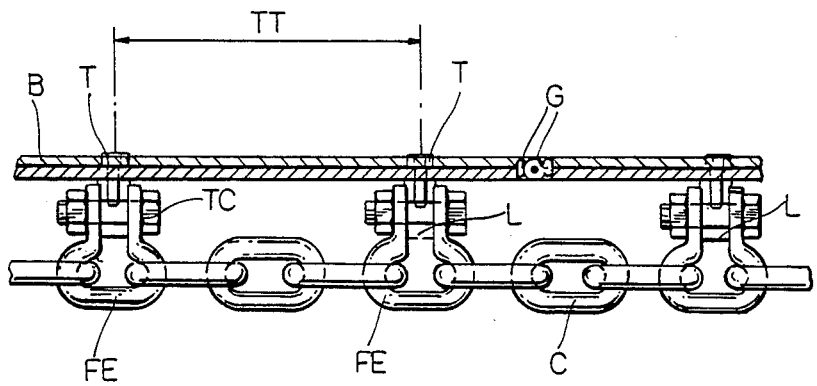
Figure 2B:
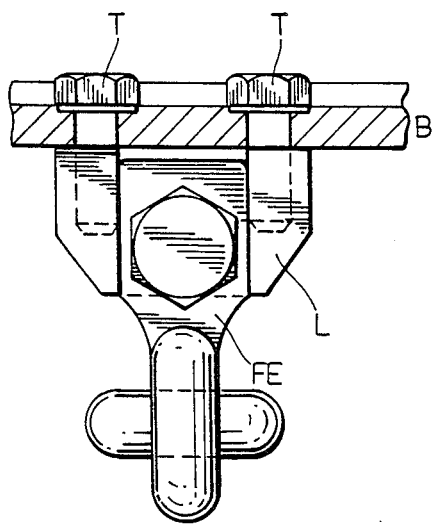

FIG. 2 subdivided into 2a and 2b, shows a detail of the conveyor belt in FIG. 1, frontal and lateral views.

Figure 3A:
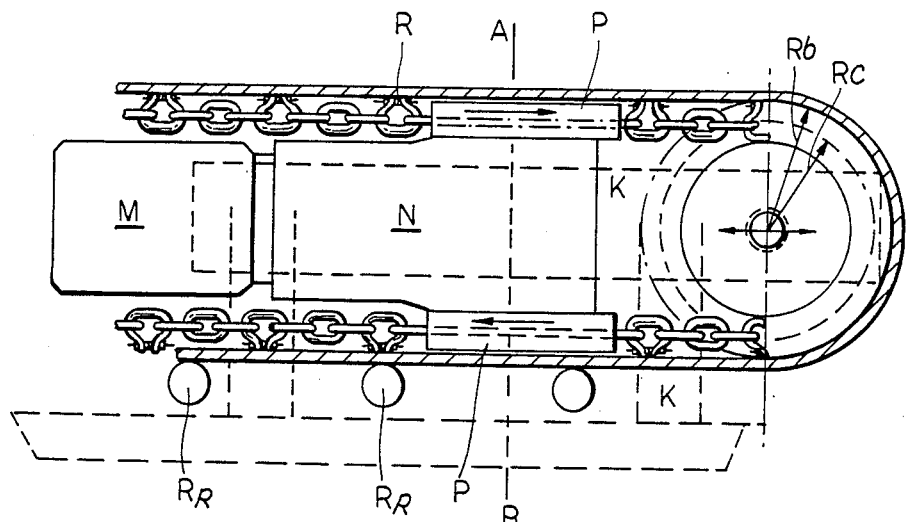
Figure 3B:
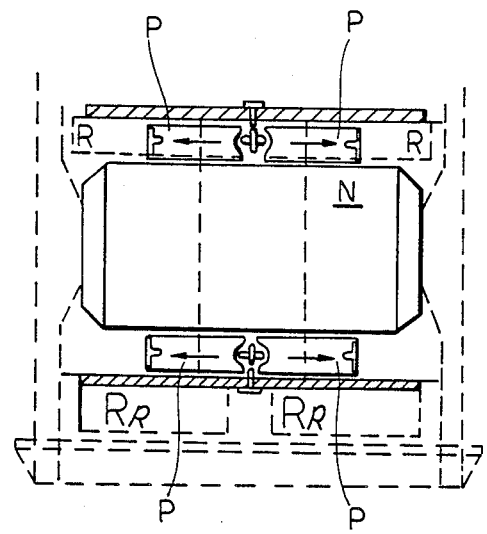
Figure 4:
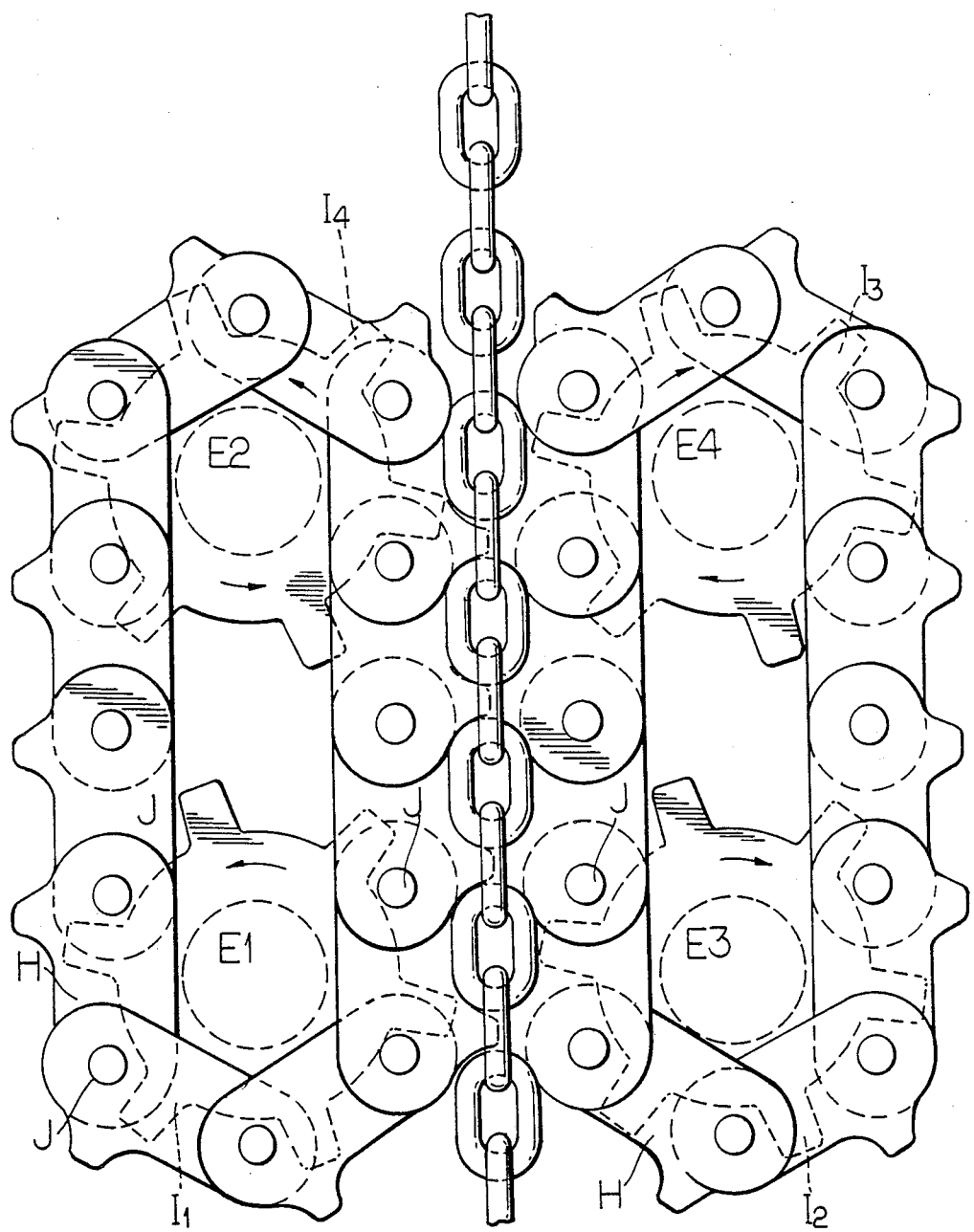
Figure 5A:
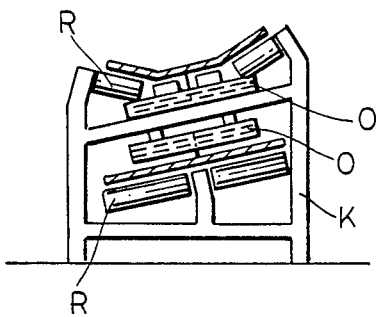
Figure 5B:
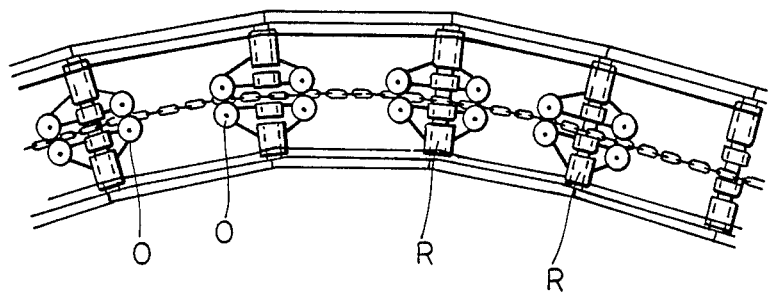

FIG. 3 subdivided into 3a and 3b, shows a detail of the drive unit of the conveyor belt to which the invention relates, frontal and transversal views;

FIG. 4 shows a detail of the CATERPILLAR TRACK type drive which form part of the reducing gear; and FIG. 5, subdivided into 5a and 5b, shows a detail of the guiding parts of the conveyor belt which is the subject matter of the invention.

FIG. 1 shows a general arrangement of the chain-hauled conveyor belt which is the subject matter of the invention. It will be seen that in the example shown in the figure, this conveyor is made up of a principal drive unit (1), an intermediate drive unit (2) and a returning apparatus (3). In this example, only a single intermediate drive unit has been shown, although, in accordance with the requirements obtaining in each case two or more of these drive units can be incorporated, bearing in mind that the distance between drive units or between the last drive unit and the returning apparatus (3) is determined by the resistance to stress of the chain and output capacity of the drive units. Each of these three components (1, 2 and 3) is explained in greater detail in the description that follows.

FIG. 2 shows in detail a conveyor belt (B) which incorporates the conveyor which is the subject matter of this invention. It is a belt of a type commonly installed on existing conveyors, but to which has been added a link chain attached to the belt by means of screws or some other means of attachment. This belt, made of rubber, polyvinyl chloride or any other material, could be specially designed to meet the conditions to which it will be subjected. The link chain (C) can be of any known type such as, for example, a type which complies with standard DIN 22 252 of the International Organization for Standardization (ISO) rules connected with round-link chaines for mining. As can be seen from FIG. 2, the chain in question is attached to the conveyor belt (B) by a series of false links (FE), which, in the embodiment example shown in the figure, include a closing bolt (TC) and are fixed to the conveyor belt by means of screws (T). There is also a fitting piece (L) on the link to which the belt is attached. Each of these false links hauls the length of belt contained between itself and the next false link (the distance TT in FIG. 2) and, given the proximity to one another of the false links, the traction necessary is minimal.

The conveyor belt which is the subject matter of this invention requires that the said belt should be lengthened or shortened. These requirements may be met by dividing the belt into as many sections of the desired length as may be necessary. These sections may be connected to each other, in the case of the belt, by means of any of the usual types of staple (G) and, in the case of the chain, by means of the false links (FE).

These false links are commercially available, although not in a form suitable for the purposes of the present invention.

This conveyor belt (B) with its chain (C) rests on rollers (R), also similar to those already available on the market, with their supporting frame (K in FIG. 5a), but the rollers are arranged in such a way as to permit the passage of the chain between the two located on the under side.

Turning to FIG. 3, which shows in detail the drive mechanism for the conveyor belt which is the subject matter of this invention, it will be seen that the drive consists of a drive motor (M), a reduction gear (N), racks or CATERPILLAR TRACK type drive (P), the chain and a movable belt returning drum. All of these parts are mounted on a common frame (K).

The motor (M), which is usually an electrical device, may be of any type delivering a number of revolutions per minute and a power output which are suitable for the conveyor to which it is to be fitted.

The reduction gear (N) must be designed with a view to providing the conveyer belt with a suitable velocity, as with a normal reduction gear, but must possess eight output shafts, arranged in two sets of four on opposite sides of the housing. On each side, two shafts have the same direction of rotation and the other two have the opposite direction of rotation.

On the opposite side of the reducing gear there is a similar arrangement, but enabling the chain to move in the reverse direction.

Another drive component shown in FIG. 3 is the movable returning drum that may be removed in an intermediary drive unit when multiple drive units are used. In addition, the returning drum is adjustable, within the drive means by an adjustment mechanism so that the tension on the conveyor belt and the chain can be adjusted by properly positioning the returning drum on the drive means. This is a cylindrical drum which has a groove in the middle which allows the chain to slot into it, the chain links remaining slack since the radius described by the chain Rc is smaller than the radius described by the belt Rb. On existing conveyor belts, where traction to the chain or similar device is provided by the drum, it is the belt which has to acquire greater length in order to absorb the difference between Rb and Rc with the resulting complication that was solved by means of sliding trays, a combination of trays and rubber sections, etc. the structure of the driving mechanism of the present invention, however, the driving mechanism can be repeated as many times as necessary along the length of the conveyor belt simply by removing the returning drum; the same type of belt can therefore be used whatever the overall length of the conveyor, thus preventing the belt from becoming progressively more expensive as it increases in length. It is worth emphasizing this point because it can result in a considerably cheaper rubber or PVC belt. Indeed, if traction is applied to the chain, the belt is not subjected to tension. Each false link pulls the section of belt between itself and the next false link (the distance TT) and, owing to the proximity to one another of the false links, the traction required is minimal. A further consequence of this is that the device connecting the chain to the belt can be of lighter construction. The tension of the chain is determined by the drive unit and the returning device, or else by the the drive unit and the intermediate units, but never by the belt. On the returning drums the tension of the belt is determined by the drum (being movable), and the chain remains slack.

The returning apparatus shown in the earlier FIG. 1 is a component similar to the drive, but is located in an inverted position in relation to it and moreover does not require a motor, that is, it consists of the sets of racks or caterpillars and the movable returning drum. The reduction gear (N) can also be dispensed with, leaving a case containing only the reducing gear drive shafts and the racks or CATERPILLAR TRACK type drive.

In FIG. 4 of the accompanying drawings, a detail of the racks or CATERPILLAR TRACK type drive which form part of the drive reducing gear is shown. It will be seen from the figure that these racks or CATERPILLAR TRACK type drive are composed of a series of links (H) which are connected by pins (J) and are what allow the pinions (I) to exert their pulling force.

The output shafts of the reduction gear (N) possess a series of pinions fixed to them, which are similar to those found in articulated roller chain drive units, and are what move the racks or CATERPILLAR TRACK type drive (P) which engage with and draw along the chain attached to the belt (FIG. 4). The four shafts E1, E2, E3 and E4 rotate at the same velocity, E1 and E2 in one direction and E3 and E4 in the other. The pinions I1, I2, I3 and I4 engage with the links (H) of the racks or caterpillars and it is precisely these links (H) which engage with the chain attached to the belt and cause it to move.

Finally, FIG. 5 shows a detail of the guiding components of the conveyor which is the subject matter of this invention. These guiding components are simply components which guide the chain assisted by a series of rollers (R). The chain may be guided between pulleys (O), toothed or untoothed, in such a way as to cause it to take both vertical and longitudinal curves. The rollers, as shown in FIG. 5, can be mounted so as to allow the belt to be banked for greatest adaptability.

It can be seen that the pulleys (O) may be located on the supporting frames of the two rollers (R), as shown in FIG. 5a.

Experts in the field will appreciate that the present invention can incorporate variations and modifications without departing from its essential nature and scope; such variations should be taken as being included in this case.

I claim:

1. A chain-hauled conveyor belt apparatus comprising:

a conveyor belt having an upper run and a lower run;
a frame;
rollers positioned on said frame so that the conveyor belt can rest against said rollers;
a chain connected to said belt;
at least one drive unit, connectable to a motor and having reduction gears, said drive unit having rotatable output shafts that are connectable to said reduction gears, said output shafts extend from the drive unit in opposite directions;
pinion gears connected to said output shafts and arranged with said output shafts to form at least two pairs of adjacent sets of pinion gears, one of said at least two pairs are adjacent to said upper run and another of said at least two pairs are adjacent said lower run and each set is rotatable in the opposite direction from the adjacent set and each said set consists of at least two pinion gears;
a CATERPILLAR TRACK rotatably mounted on each set of pinion gears to contact said chain so that the opposite rotation of said adjacent sets of pinion gears moves said upper and lower run; and
at least one cylindrical returning drum movably attached to said apparatus so that the axial positioning of the drum along the drive unit can be varied by a positioning means, said returning drum has an upper surface that engages the belt and a lower central grove that allows the chain to be slackened as it passes around the returning drum wherein the tension in the belt is determined by the position of the returning drum.

2. The apparatus of claim 1, wherein pulley chain guides extend from said frame so as to guide the chain.

3. The apparatus of claim 1, wherein multiple drive units are serially connected so that the drive units at ends of the apparatus have returning drums and intermediary drive units, between the ends, do not have returning drums.

4. The apparatus of claim 1, wherein the CATERPILLAR TRACKS can operate independently from one another.

5. The apparatus of claim 1, wherein returning rollers extend from a bottom portion of said frame so that the lower run of the belt rests against said returning roller with the chain positioned above the belt.

6. The apparatus of claim 1, wherein said conveyor belt may be subdivided into a number of sections connected to each other by an attachment means.

7. The apparatus of claim 1, wherein pulley chain guides extend from said frame so as to guide the chain, said guides are toothed.

* * * * *